US011049025B2

(12) United States Patent
Tosh (10) Patent No.: US 11,049,025 B2
(45) Date of Patent: Jun. 29, 2021

(54) SYSTEMS AND METHODS FOR COMPUTE NODE MANAGEMENT PROTOCOLS (71) Applicant: salesforce.com, inc., San Francisco, CA (US)

(72) Inventor: George Tosh, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 1075 days.

(21) Appl. No.: 15/459,725

(22) Filed: Mar. 15, 2017

(65) Prior Publication Data
US 2018/0268302 A1    Sep. 20, 2018

(51) Int. Cl.
*G06N 5/04* (2006.01)
*G06F 9/50* (2006.01)

(52) U.S. Cl.
CPC ............ *G06N 5/04* (2013.01); *G06F 9/5055* (2013.01); *G06F 9/5066* (2013.01)

(58) Field of Classification Search
CPC ....... G06F 9/5055; G06F 9/465; G06F 9/5066
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |

(Continued)

FOREIGN PATENT DOCUMENTS

JP    2008077281 A    4/2008

OTHER PUBLICATIONS

Adler, Mark et al.; AAAI Workshop on Cooperation Among Heterogeneous Intelligent Agents; AI Magazine vol. 13 No. 2 (1992) (© AAAI). (Year: 1992).*

(Continued)

*Primary Examiner* — Stanley K. Hill
(74) *Attorney, Agent, or Firm* — LKGlobal | Lorenz & Kopf, LLP (57) ABSTRACT Methods and systems are provided for assigning computational problems to be solved by compute nodes that have artificial intelligence problem-solving capability. A method includes receiving a computational problem to be solved. Node-related processing attributes of the compute nodes are used to determine which one or more of the compute nodes are capable of solving the computational problem. One or more of the compute nodes are selected to handle the computational problem based upon the determination.

21 Claims, 8 Drawing Sheets

(56) References Cited

U.S. PATENT DOCUMENTS

| | | | |
|---|---|---|---|
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,289,976 B2 | 10/2007 | Kihneman et al. | |
| 7,290,056 B1 * | 10/2007 | McLaughlin, Jr. | H04L 43/0852 709/201 |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,590,984 B2 | 9/2009 | Kaufman et al. | |
| 7,620,655 B2 | 11/2009 | Larsson et al. | |
| 7,698,160 B2 | 4/2010 | Beaven et al. | |
| 7,774,822 B2 * | 8/2010 | David Buckley | H04L 41/0816 |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,230,070 B2 * | 7/2012 | Buyya | G06F 9/5072 709/226 |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,201,690 B2 * | 12/2015 | Meng | G06F 9/5066 |
| 9,325,593 B2 * | 4/2016 | Suchter | G06F 9/5038 |
| 2001/0039581 A1 | 11/2001 | Deng et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2007/0101336 A1 | 5/2007 | Moore et al. | |
| 2008/0249972 A1 | 10/2008 | Dillon | |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2009/0319576 A1 * | 12/2009 | Srour | H04L 41/0806 |
| 2011/0247051 A1 | 10/2011 | Bulumulla et al. | |
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2013/0205028 A1 * | 8/2013 | Crockett | G06F 9/5027 709/226 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0019987 A1 * | 1/2014 | Verma | G06F 9/5038 718/103 |
| 2014/0289733 A1 * | 9/2014 | Fritz | G06F 9/5066 718/104 |
| 2016/0210550 A1 | 7/2016 | Merrill et al. | |
| 2017/0329642 A1 * | 11/2017 | Kim | G06F 9/5011 |
| 2018/0150333 A1 * | 5/2018 | Alapati | G06F 9/4881 |

(56) References Cited

U.S. PATENT DOCUMENTS

OTHER PUBLICATIONS

Kuhn, Wolfgang et al.; FPGA-Based Compute Nodes for the PANDA Experiment at FAIR; 2007 IEEE; 2 pages. (Year: 2013).*
Pathak, Jyotishman; Should We Compare Web and Grid Services?; 2005 Iowa State University; 4 pages. (Year: 2005).*
European Patent Office, International Search Report for PCT/US2018/022033 dated Jun. 26, 2018, 6 pages.

* cited by examiner

SYSTEMS AND METHODS FOR COMPUTE NODE MANAGEMENT PROTOCOLS

TECHNICAL FIELD

This disclosure relates to compute node systems and more particularly to compute node management protocols.

BACKGROUND

Distributed computing systems arranged as clusters of compute nodes help solve computational problems of increasing technical complexity. For example, computational problems can involve the application of sophisticated algorithms (e.g., artificial intelligence-based algorithms) to large data sets to uncover patterns in data. In view of increasing problem complexity, computational requirements for such systems have also significantly increased.

Currently most algorithm-based solutions work by spreading the load among compute nodes of varying capabilities. However, managing these disparate mechanisms requires significant thought and planning both before implementation and when capacity changes occur. Additionally, inefficient utilization of resources can arise as the clusters of machines grow.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

The subject matter described herein discloses apparatuses, systems, techniques and articles that provide user access to compute node processing capability, such as for using artificial intelligence-based (AI-based) compute nodes to solve complex problems. In some examples, apparatuses, systems, techniques and articles disclosed herein provide a protocol for managing large-scale implementations of AI-based compute nodes. In some examples, systems and methods disclosed herein analyze algorithm-related processing attributes of compute nodes to determine which AI-based components are most suited for solving a computational problem.

Figure 1:
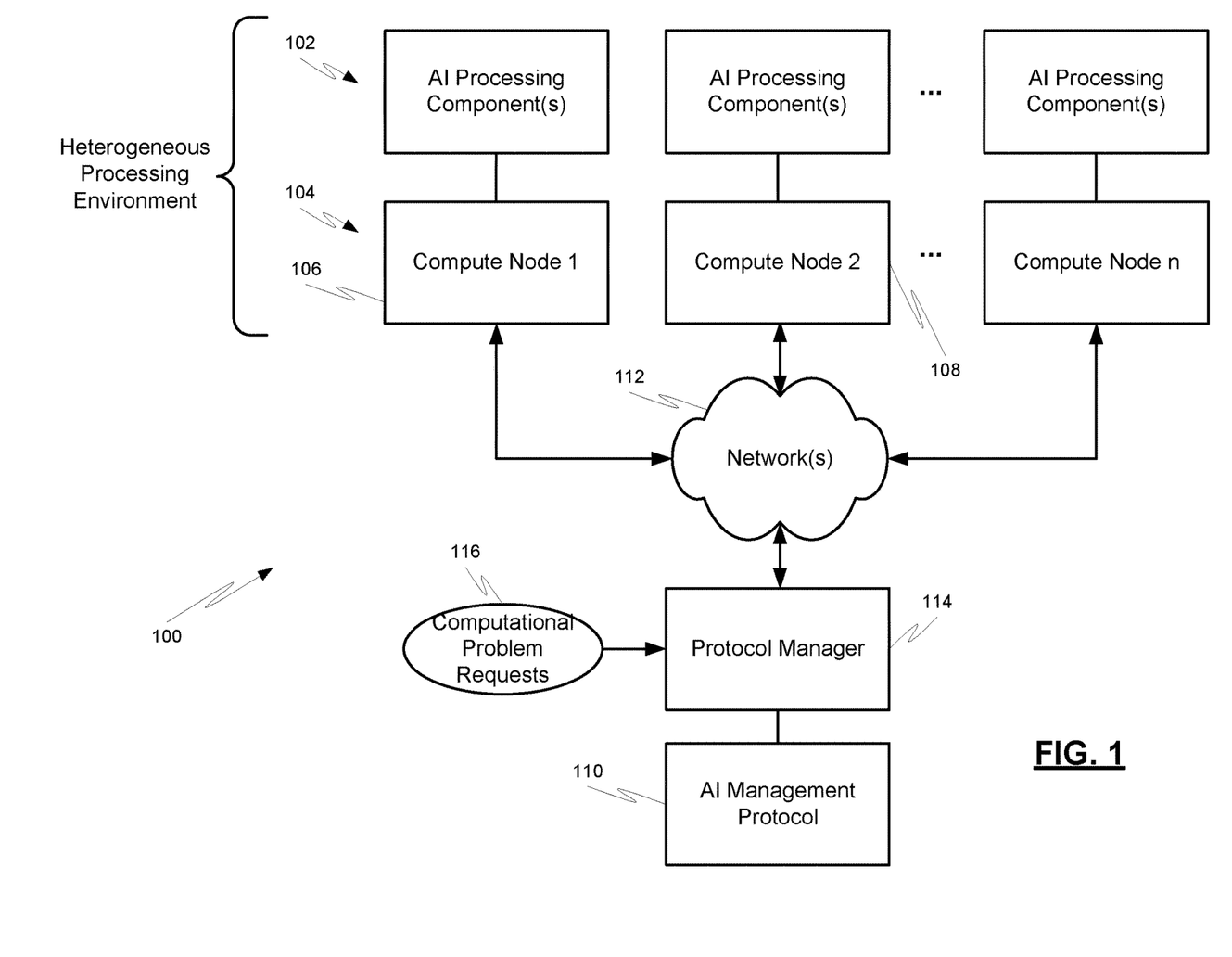
FIG. 1 is a block diagram illustrating a computing environment according to an embodiment.

FIG. 1 and the following discussion are intended to provide a brief, general description of a non-limiting example of an example environment in which the embodiments described herein may be implemented. Those of ordinary skill in the art will appreciate that the embodiments described herein may be practiced with other computing environments.

FIG. 1 depicts at 100 an exemplary embodiment of a system for managing AI processing components 102. The AI processing components 102 are used to solve complex computations problems and operate on a cluster of servers, called compute nodes 104. The compute nodes 104 communicate with each other to make a set of services provided by the AI processing components 102 available to clients.

When a large multi-user cluster needs to access and process large amounts of data, task scheduling can pose a technical challenge, especially in a heterogeneous cluster with a complex application environment. An example of such a heterogeneous environment can include some compute nodes using CPU (central processing unit) resources, while others may use ASIC (Application Specific Integrated Circuit), FPGA (Field Programmable Gate Array), or GPU (Graphical Processor Unit) resources to solve specific computational problems. As an illustration, compute node 1 at 106 has three dedicated ASICs in this example for handling a map reduction function that is attached to a PCI (Peripheral Component Interconnect) bus, while compute node 2 at 108 uses a CPU-implemented machine learning algorithm for analyzing DNA sequencing.

The system 100 provides an AI management protocol 110 to assist in managing implementations of the AI-based compute nodes 104 for processing large amounts of data. The AI management protocol 102 allows for leverage of available computational resources provided by the AI-based compute nodes 104. More specifically, the AI management protocol 110 provides for the utilization of ASIC, FPGA, GPU, CPU, and other devices for the purpose of solving large complex mathematical problems in the AI space.

Compute nodes 104 use the AI management protocol 110 to exchange information over data communication network(s) 112 with each other about their respective hardware/software problem-solving capabilities. Based on such information from the compute nodes 104, the protocol manager 114 handles computational problem requests 116 by determining which of the system's AI resources should handle the requests 116.

Data communication network(s) 112 interconnect the compute nodes 104 so that a set of processing services can be available through the distributed AI-based computing applications. The data communication network(s) 112 handling the exchange of information among the compute nodes 104 may be any digital or other communications network capable of transmitting messages or data between devices, systems, or components. In certain embodiments, the data communication network(s) 112 includes a packet switched network that facilitates packet-based data communication, addressing, and data routing. The packet switched network could be, for example, a wide area network, the Internet, or the like. In various embodiments, the data communication network(s) 112 includes any number of public or private data connections, links or network connections supporting any number of communications protocols. The data communication network(s) 112 may include the Internet, for example, or any other network based upon TCP/IP or other conventional protocols. In various embodiments, the data communication network(s) 112 could also incorporate Ethernet or Infiniband communication links (where Ethernet and Infiniband are trademarks) as well as a wireless and/or wired telephone network, such as a cellular communications network for communicating with mobile phones, personal digital assistants, and/or the like. The data communication network(s) 112 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

Figure 2:
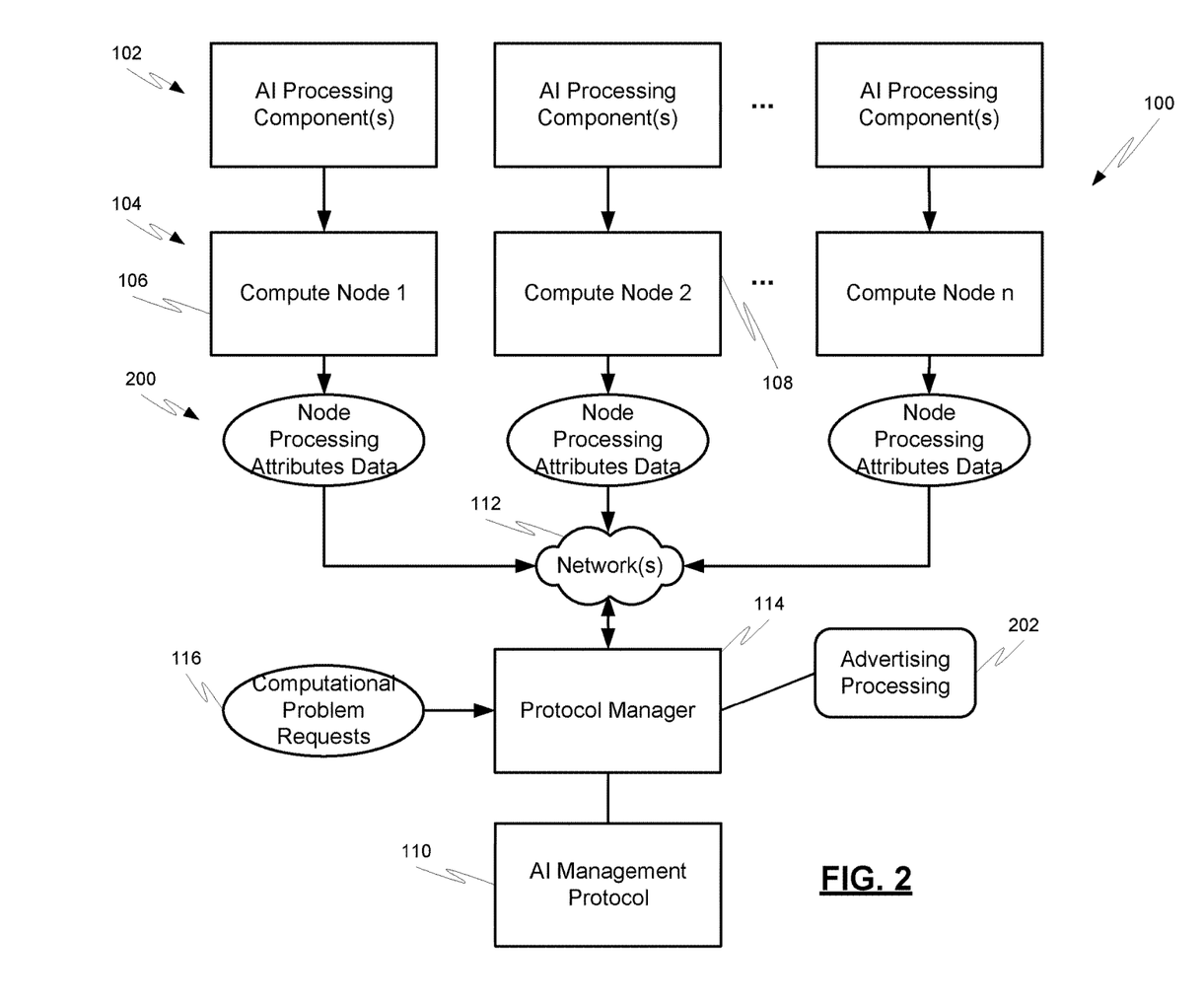
FIG. 2 is a block diagram illustrating compute nodes advertising their technical capabilities.

FIG. 2 depicts compute nodes 104 advertising their technical capabilities by providing node processing attributes data 200 for use in properly assigning computational problems to resources within the system 100. The protocol manager 114 includes advertising processing functionality 202 to manage the node processing attributes data 200 sent by the compute nodes 104. The advertising processing process 202 stores the technical capabilities of the compute nodes 104 and exchanges the information with other compute nodes 104 within the system 100. In this manner, the protocol manager 114 provides a service for self-discovery of compute nodes 104 in an artificial intelligence cluster and advertisement of technical capabilities within the cluster.

The node processing attributes data 200 can include different types of information about the problem-solving capabilities associated with the compute nodes 104. For example, the node processing attributes data 200 can indicate specific algorithms that a particular compute node can handle. The AI management protocol 110 can also be configured to support multiple algorithm compute resources per node. The algorithm compute resources can constitute many different types of AI algorithms. For example, the system 100 may have neural network algorithms, support vector machine algorithms, genetic algorithms, etc.

The algorithm capability information helps address the problem of using specialized hardware such as ASICs (which can solve predetermined algorithms with great speed but are limited to a single problem) and non-specialized hardware such as CPUs (which can handle a wide variety of tasks but at a much lower speed). An example of compute nodes using specialized hardware includes an FPGA-based system for particle detection in antiproton physics experiments. In this example system, FPGA-based compute nodes are equipped with multi-Gbit/s bandwidth capability for particle event analysis. More specifically, the compute nodes perform pattern recognition for ring-imaging Cherenkov detectors, cluster searching, etc. Moreover, FPGAs such as the XILINX Virtex 4 FX series provide high speed connectivity via RocketIO as well as via GBit Ethernet. The following reference provides additional information and is hereby incorporated herein for all purposes: W. Kuhn et al., "FPGA-Based Compute Nodes for the PANDA Experiment at FAIR," IEEE Xplore, April 2007, DOI: 10.1109/RTC.2007.4382729. Many other types of cluster architectures can be used, such as the hardware systems and communication pathways described in U.S. Pat. No. 9,325,593 (entitled "Systems, methods, and devices for dynamic resource monitoring and allocation in a cluster system") which is hereby incorporated herein for all purposes.

The node processing attributes data 200 indicates the algorithm capability of a compute node by using an algorithm ID which is shared throughout the cluster. With shared algorithm IDs, each algorithm capable of being performed by the cluster is advertised throughout the cluster along with a metric identifying speed with which the algorithm can be solved. For example, the capabilities of ASICs for a single algorithm within the cluster and the capabilities of CPUs for multiple algorithms can be communicated consistently throughout the system 100 with such IDs.

Figure 3:
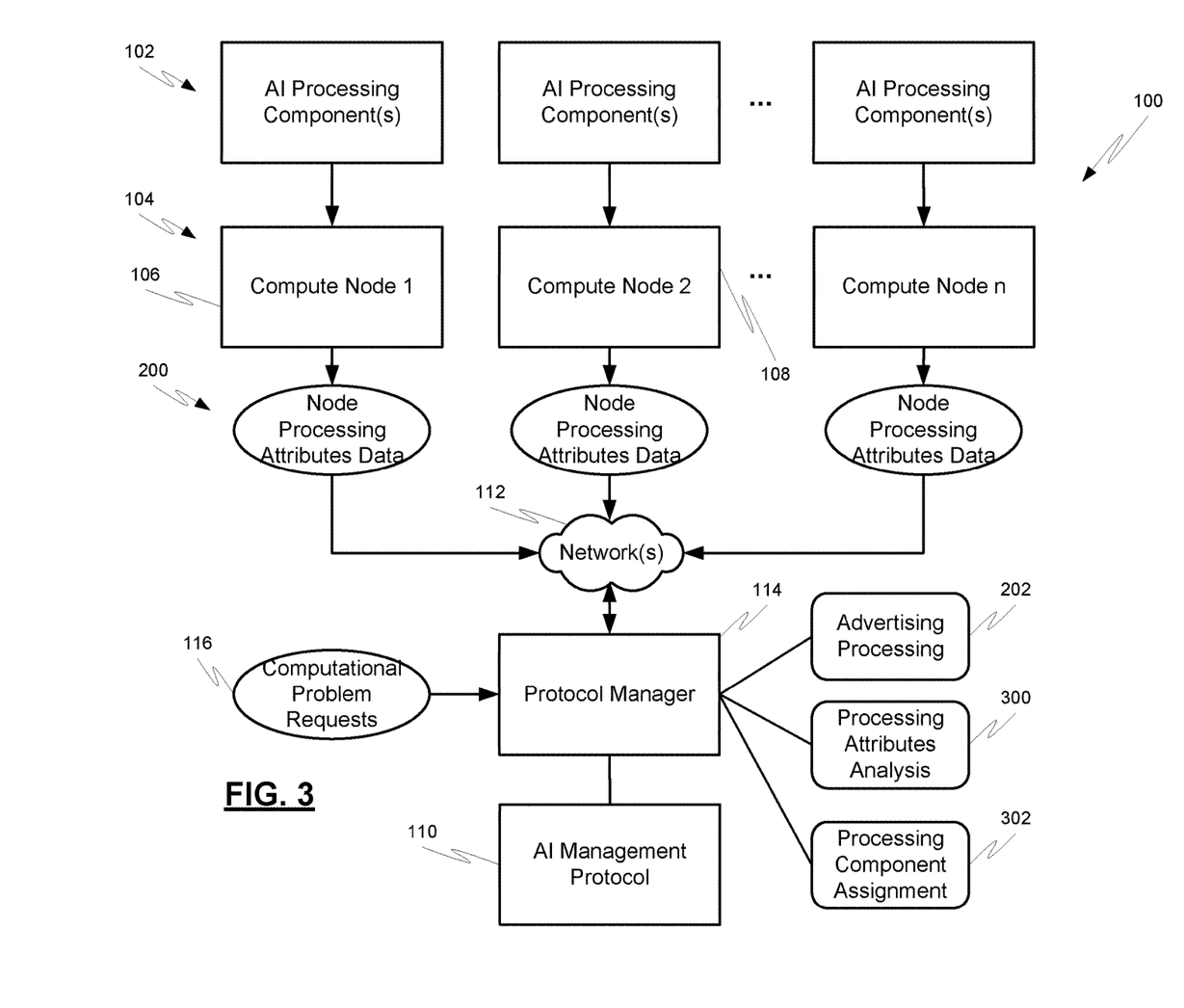
FIG. 3 is a block diagram illustrating analysis of compute node attributes.

FIG. 3 depicts that the protocol manager 114 not only handles the advertising of technical capabilities of the compute nodes 104 but also analyzes those capabilities at 300 so that component assignment process 302 can properly determine the compute nodes to handle the computational problem. Component assignment process 302 recognizes that a computational problem can typically be solved in different ways by computer hardware or software. By examining the particular computational problem request with the analysis performed by attribute analysis process 300, the component assignment process 302 can determine which components of hardware and software within the system 100 can solve the problem most efficiently.

It should be understood that the protocol manager 114 can be configured in many different ways. For example, a distribution compute node (as well as a backup) can be assigned to operate as the protocol manager 114. Such a compute node knows the capabilities and costs of each machine on the network.

Figure 4:
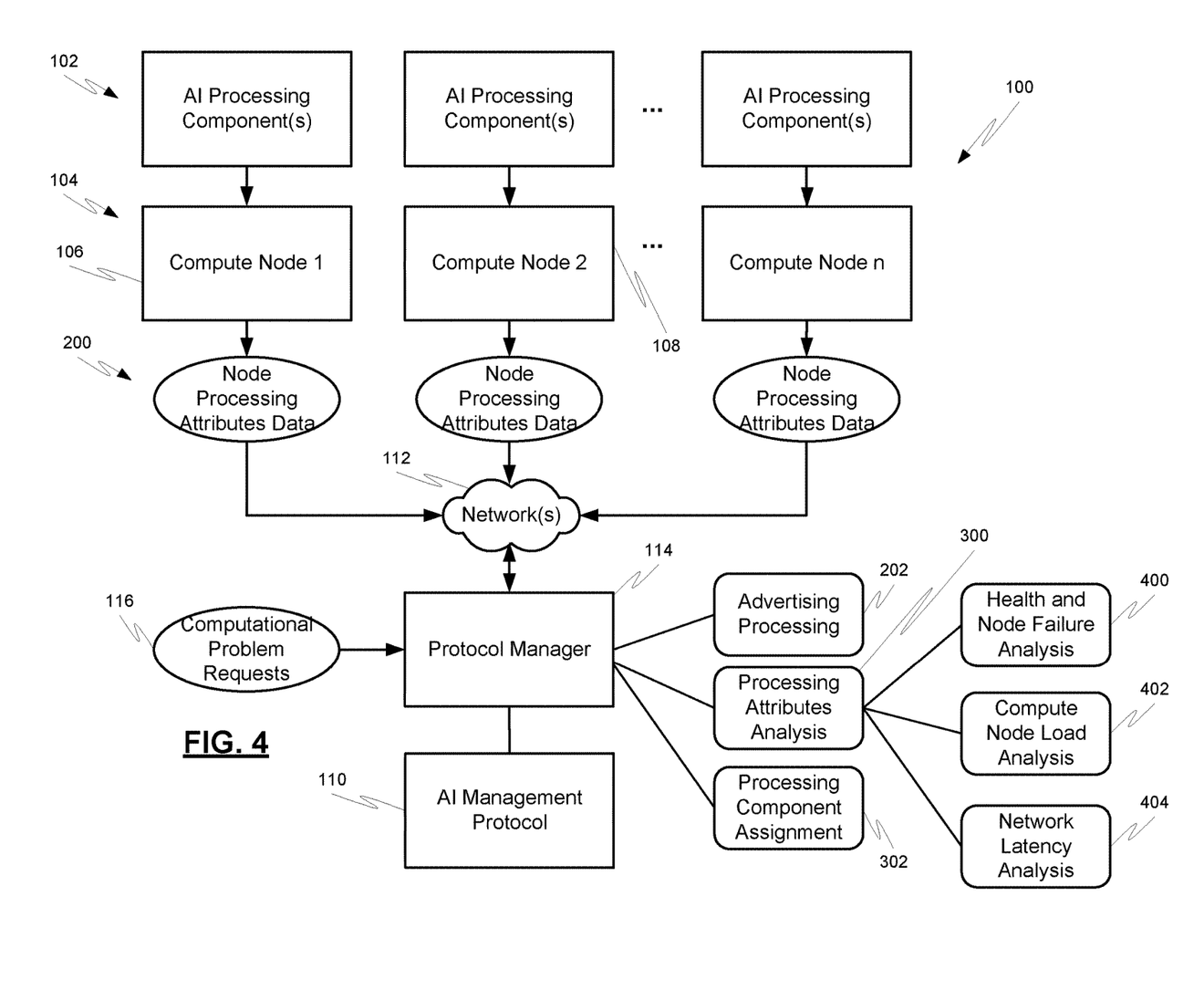
FIG. 4 is a block diagram illustrating analysis of network latency characteristics and processing environment characteristics.

FIG. 4 provides an example of attributes that the attribute analysis process 300 can analyze for consideration by the component assignment process 302 in determining resource allocation. For example, the compute nodes 104 can advertise through the AI management protocol 110 their respective processing capabilities, which algorithms they can handle, and load and health information about the compute nodes. The protocol manager 114 includes additional functionality to analyze such information. For example, node analysis process 400 can assess health and node failure information from the compute nodes 104 by determining whether a compute node passes algorithm health checks for each AI compute resource it has. As an illustration, if a compute node has three dedicated ASICs for handling a map reduction function attached to its PCI bus and if one of the ASICs fails, then the compute node can either remove itself entirely from the cluster, or may continue to advertise itself in a degraded state to the cluster based on how the AI management protocol 110 has been configured.

Load analysis process 402 assesses the loads of the compute nodes 104. According to the AI management protocol 110, each algorithm has a specific load metric that is generated by executing an algorithmic sample or proof against the hardware and is measured in microseconds. The proof may vary based on the type of hardware used in the system 100. For example, an ASIC will typically be faster than a GPU which typically will be faster than a CPU. This can then be combined with a system load metric to generate the final system load metric, thereby allowing the protocol manager 114 to customize load per hardware profile as well as have control over which machines are utilized first or last.

The protocol manager 114 can further include network latency analysis process 402. Network latency analysis process 402 calculates a network distance vector from a known requestor point. This analysis includes measuring the compute nodes 104 in an AI cluster with respect to the latency to the known requestor point within the data center. For example, when an external end user is initiating the request, the compute nodes closest to the external gateway router may be considered faster candidates by the network latency analysis functionally 404 for smaller compute problems. This helps identify when nodes in a DR (Disaster Recovery) data center may be utilized, and when it would be more efficient to send work to them based on network latency and expected utilization.

Figure 5:
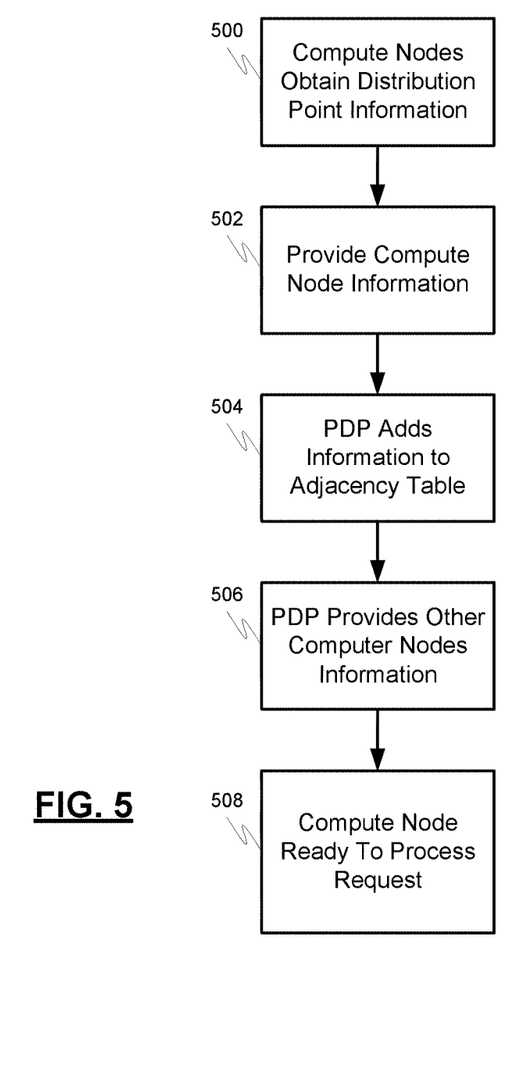
FIG. 5 is a flow chart depicting an operational scenario involving compute nodes advertising their capabilities.
Figure 6:
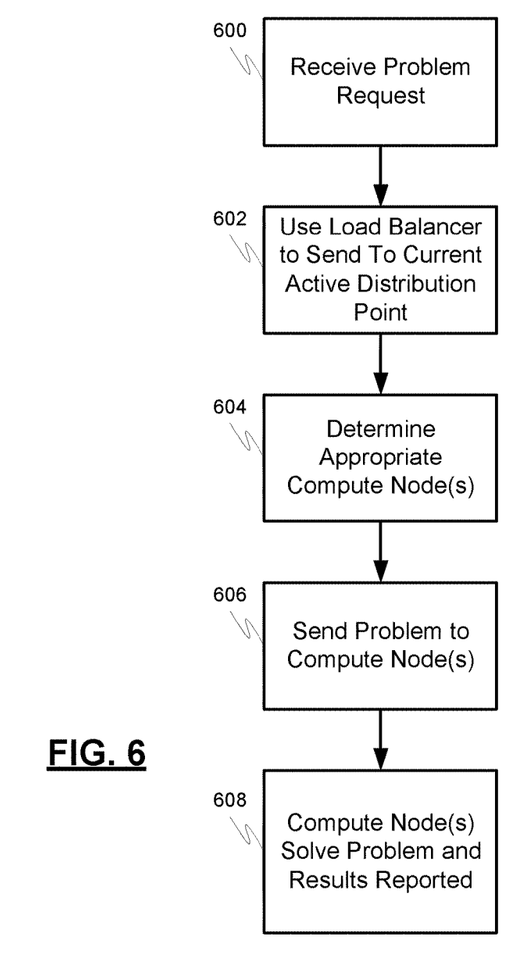
FIG. 6 is a flow chart depicting an operational scenario involving allocation of compute node resources for solving computational problems.

FIGS. 5 and 6 provide operational scenarios where compute nodes advertise their capabilities which will be used for allocating compute node resources to solve a computational problem. In the operational scenario of FIG. 5, a protocol manager implements an AI management protocol for the compute nodes by using distribution points for the exchange of problem-solving node capabilities. More specifically, compute nodes obtain at process block 500 information about the IP address of the protocol manager after the protocol manager initially starts up. In this example, the protocol manager uses a primary distribution point (PDP) and a secondary distribution point (SDP) for information exchange. These addresses are subsequently used at predetermined times (e.g., every 30 minutes, etc.) for the broadcast of a full table of learned node capabilities. This ensures that all machines on the network are in sync and aware of the capabilities of other machines on the network.

For purposes of advertising capabilities on a network link, the following multicast IP addresses can be used: Primary Distribution Point: 224.0.0.240, UDP 849; and Secondary Distribution Point 224.0.0.241, UDP 849. The flexibility of the AI management protocol is provided in part by distribution points scaling to new types of hardware that can be implemented in the future beyond the use of the fastest type of hardware available today (e.g., ASICs).

In this operational scenario, the compute nodes are part of the same local multicast network, however, it should be understood that other configurations can be used. For example, through multicast routing and MPBGP (MultiProtocol BGP), the functionality can be extended across multiple sites.

At process block 502, each machine passes along information about the preconfigured problem types and costs they have learned to all of their adjacent machines. In this operational scenario, the machines are configured with common problem identifiers for standardizing communication of their problem-solving capabilities with each other.

A compute node communicates with the PDP and then sends to the PDP the list of capabilities for which it is configured. The PDP adds this information at process block 504 to a node information table and provides the machines with a full list of the capabilities of the machines on the network at process block 506. At this point, the machines are ready to begin processing requests sent by the distribution point as indicated at process block 508.

FIG. 6 provides an operational scenario where an external requesting computer has a computational problem that requires significant resources to solve. At process block 600, the request from the external requesting computer is sent to a preconfigured virtual IP address. A load balancer is used at process block 602 to send the problem to the current active distribution point. Load balancing ensures that a single node does not become overwhelmed by always having specific problems routed to it simply because it has the fastest hardware.

At process block 604, the distribution point then uses its problem routing table to determine which compute node(s) should be used. The algorithm ID can determine which resources can handle the computational problem. In this operational scenario, machines operating according to the AI management protocol within the network have a unique ID for each type of calculation that they are to perform. For example, machines with a CPU can have a wildcard (e.g., an "*") in the field for algorithm type because they can solve any type of algorithm, albeit at a higher cost. Machines that cannot handle the computational problem are removed from consideration.

Process block 604 further considers other additional factors, such as an algorithm speed cost metric and a network cost metric for determining which resource(s) have the lowest cost for handling a computational problem. The lowest cost computation can be done in many different ways, such as by using Dijkstra's algorithm to find the least costly path to reach a goal.

As known generally in the art, Dijkstra's algorithm assigns costs for traversing different paths to reach a goal. Within the specific operational scenario of FIG. 6, the following algorithm costs can be used as costs in Dijkstra's algorithm for assessing node resources: ASIC=100; FPGA=200; GPU=300; and CPU=400. These values indicate the total time to process a computational problem as measured in milliseconds. A lower value is preferred for solving a computational problem and it allows Dijkstra's algorithm to natively choose the lowest value. It also allows for the manipulation of these values in case system engineers need to manipulate these values for specific purposes.

Dijkstra's algorithm can use other costs, such as a network cost. A network cost is based on the total cost of transmitting the algorithm from the currently active distribution point to the worker compute node as measured in milliseconds. In this way, network latency and its effect on the problem being solved are taken into account. For example, the protocol manager may determine for simpler computational problems that it is less costly to route the problem to a GPU that is physically closer to the source than a remotely located ASIC where the network latency time would exceed the performance gains by routing the problem to the ASIC. The distribution point can use Dijkstra's algorithm to compute the shortest path through the network between themselves and a remote router or network destination for selecting the most suitable worker compute node.

After the resource(s) are determined at process block 604, the computational problem is sent at process block 606 to the compute node or nodes that are adequately suited for processing this type of problem. Upon receipt of the problem by a worker compute node, the worker compute node uses its resources to solve the problem and return the results at process block 608 to the external requesting computer.

Figure 7:
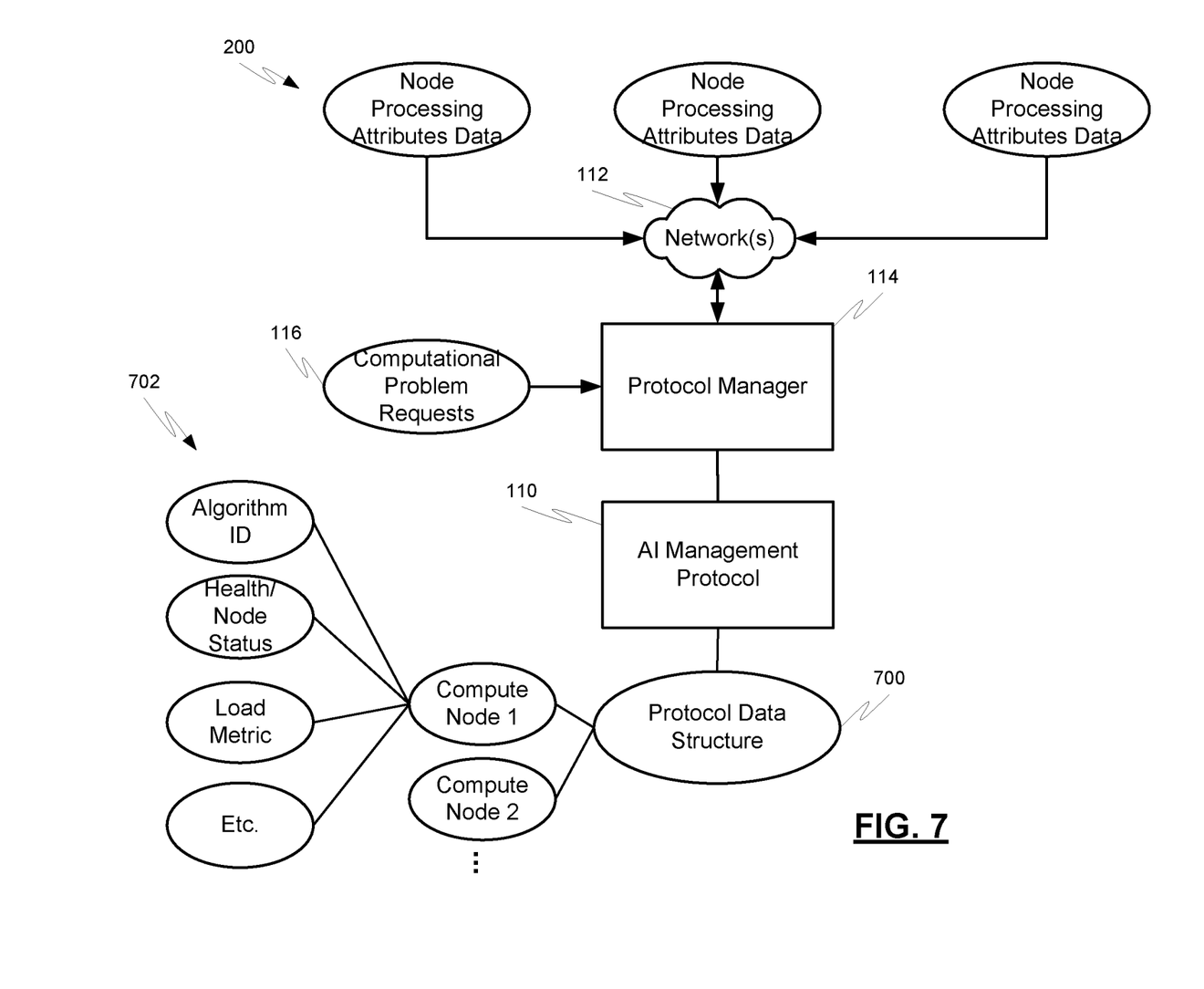
FIG. 7 is a block diagram illustrating a protocol data structure for facilitating management of compute node resources.

FIG. 7 depicts that the AI management protocol 110 can use a protocol data structure 700 to manage compute nodes 104. In one embodiment, the protocol data structure 700 can use a multi-tiered data structure to store and analyze the node processing attributes data 200 and other information of the compute nodes as shown at 702. For example, the protocol data structure 700 can include algorithm IDs, load information, and health and node status information as shown at 702 for the compute node 1 data field. This allows, among other things, for the protocol manager 114 to identify information that is missing from one or more compute nodes.

While examples have been used to disclose the invention and also to enable any person of ordinary skill in the art to make and use the invention, the patentable scope of the invention is defined by claims, and may include other examples that occur to those of ordinary skill in the art. Accordingly, the examples disclosed herein are to be considered non-limiting.

As an example of the wide scope of the systems and methods disclosed herein, the compute node interfaces used to exchange information with neighbor machines may be configured in different ways. In cases where only two machines are operating with the AI management protocol, the two routers know that they are the only "advertisements" on the link, and they exchange capability information with each other. In this case ether machines can perform the role of the distribution point.

In the case of a production network, many different machines may be on a network segment. To minimize the amount of network traffic on production links, the protocol manager elects a primary distribution machine (as well as a backup) who learns the capabilities and costs of each machine within the network.

As another example of the wide scope of the systems and methods disclosed herein, systems and methods can be configured to allow for self-discovery of compute node services in an AI cluster and advertisement of capabilities within the cluster. With such capability, the amount of personnel needed to manage AI clusters is reduced while ensuring the most efficient use of resources by the AI cluster. This supports high availability and fault tolerance as well as supports built-in health checks to ensure accuracy based on predetermined algorithm proofs.

The systems and methods as disclosed herein can be configured to allow for utilization of DR (Disaster Recovery) hardware when it is efficient to do so based on predetermined calculations (e.g., network latency vs. algorithm execution time vs. type and quantity of hardware available). Further, it can support authentication to prevent unauthorized devices from joining the cluster.

As yet another example of the wide scope of the systems and methods disclosed herein, many different types of components can constitute a heterogeneous processing environment, such as Central Processing Units (CPUs), Graphics processing Units (GPUs), Field Programmable Gate Array (FPGAs), Application Specific Integrated Circuits (ASICs), etc. A CPU is a general purpose processor. It is general purpose in the sense that it is designed to perform a wide variety of operations. Although a CPU may perform many tasks, the performance achieved may not be sufficient for more computationally intensive applications.

A GPU is designed to accelerate creation of images for a computer display. While a CPU typically consists of a few cores optimized for sequential serial processing, a GPU typically consists of thousands of smaller, more efficient cores designed for handling multiple tasks simultaneously. They are designed to perform functions such as texture mapping, image rotation, translation, shading, etc. They may also support operations (e.g., motion compensation, etc.) for accelerated video decoding.

An FPGA differs from a CPU or GPU in the sense that it is not a processor in itself because it does not run a program stored in the program memory. An FPGA can be considered as a set of reconfigurable digital logic circuits suspended in a large number of programmable inter-connects. A typical FPGA may also have dedicated memory blocks, digital clock manager, I/O banks and other features which vary across different vendors and models. Because they can be configured after manufacturing at the costumer's end, they can be used to implement any logic function (including but not limited to a processor core). This makes them ideal for re-configurable computing and application specific processing.

An ASIC is a chip that is designed for a single purpose and can only perform a specific function such as solving a mathematical problem. An advantage to ASICs is that they are considerably faster than any other solution for solving the problem that they are designed to solve. A disadvantage is that they are single purpose in that they can only be used to solve the problem for which they were built. This can make them useful for a specific problem, however for any other type of problem, they may be unusable.

The systems and methods disclosed herein may also be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the operations and implement the systems described herein.

Still further, systems and methods can be implemented in many different types of environments, such as compute nodes and other computing devices described herein having memories configured to store one or more pieces of data, either temporarily, permanently, semi-permanently, or a combination thereof. Further, a memory may include volatile memory, non-volatile memory, or a combination thereof and may be distributed across multiple devices. In various embodiments, compute nodes and computing devices may include storage medium configured to store data in a semi-permanent or substantially permanent form. In various embodiments, the storage medium may be integrated into memory.

Figure 8:
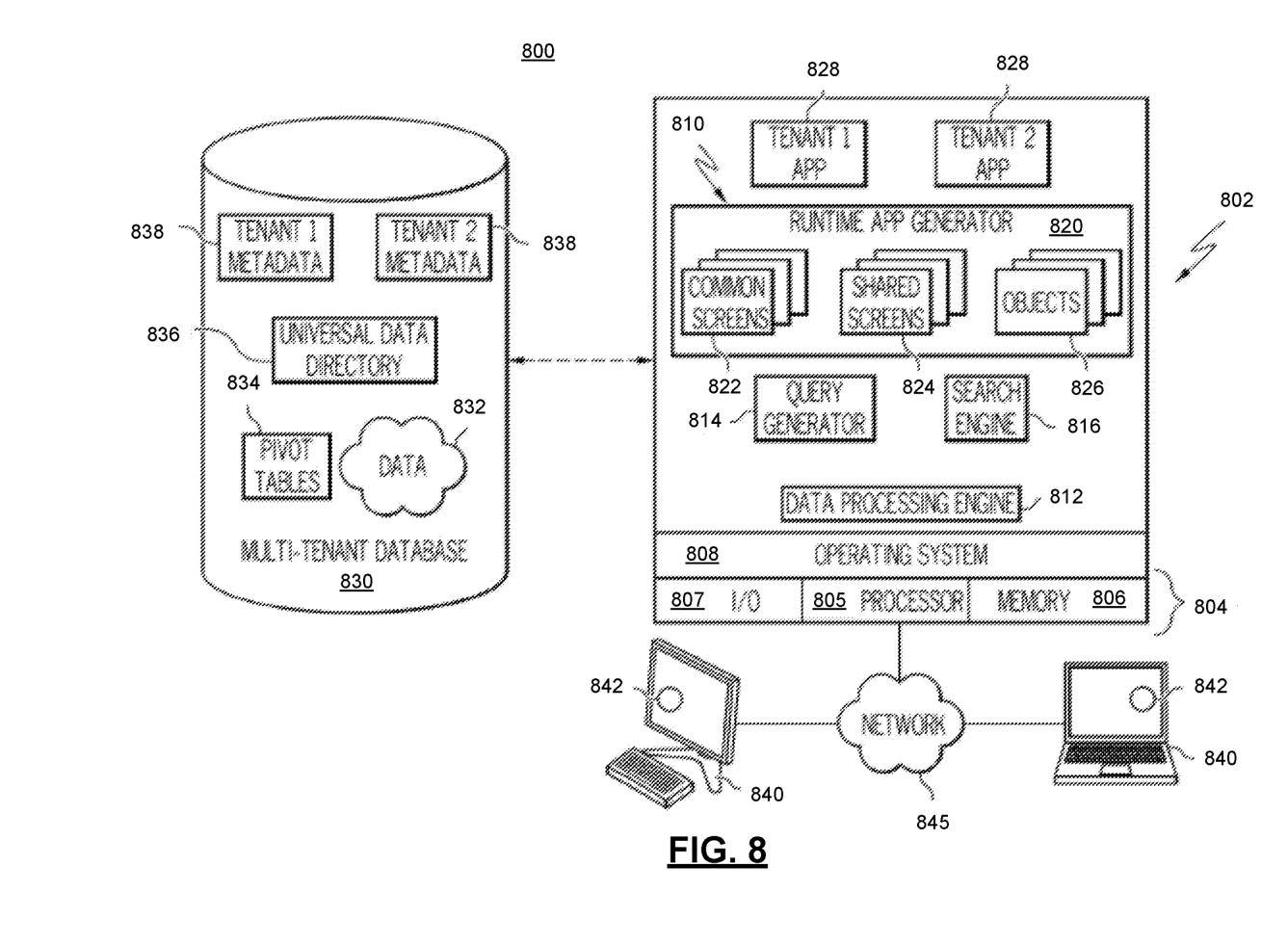
FIG. 8 is a block diagram depicting an exemplary embodiment of an on-demand multi-tenant database system.

FIG. 8 depicts another example of an environment where users can use the systems and methods described herein. FIG. 8 depicts an exemplary embodiment of users operating within an on-demand multi-tenant database system 800. The illustrated multi-tenant system 800 of FIG. 8 includes a server 802 that dynamically creates and supports virtual applications 828 based upon data 832 from a common database 830 that is shared between multiple tenants, alternatively referred to herein as a multi-tenant database. Data and services generated by the virtual applications 828 are provided via a network 845 to any number of client devices 840, as desired. Each virtual application 828 is suitably generated at run-time (or on-demand) using a common application platform 810 that securely provides access to the data 832 in the database 830 for each of the various tenants subscribing to the multi-tenant system 800. In accordance with one non-limiting example, the multi-tenant system 800 is implemented in the form of an on-demand multi-tenant customer relationship management (CRM) system that can support any number of authenticated users of multiple tenants.

As used herein, a "tenant" or an "organization" should be understood as referring to a group of one or more users or entities that shares access to common subset of the data within the multi-tenant database 830. In this regard, each tenant includes one or more users associated with, assigned to, or otherwise belonging to that respective tenant. To put it another way, each respective user within the multi-tenant system 800 is associated with, assigned to, or otherwise belongs to a particular tenant of the plurality of tenants supported by the multi-tenant system 800. Tenants may represent customers, customer departments, business or legal organizations, and/or any other entities that maintain data for particular sets of users within the multi-tenant system 800 (i.e., in the multi-tenant database 830). For example, the application server 802 may be associated with one or more tenants supported by the multi-tenant system 800. Although multiple tenants may share access to the server 802 and the database 830, the particular data and services provided from the server 802 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 832 belonging to or otherwise associated with other tenants.

The multi-tenant database 830 is any sort of repository or other data storage system capable of storing and managing the data 832 associated with any number of tenants. The database 830 may be implemented using any type of conventional database server hardware. In various embodiments, the database 830 shares processing hardware 804 with the server 802. In other embodiments, the database 830 is implemented using separate physical and/or virtual database server hardware that communicates with the server 802 to perform the various functions described herein. In an exemplary embodiment, the database 830 includes a database management system or other equivalent software capable of determining an optimal query plan for retrieving and providing a particular subset of the data 832 to an instance of virtual application 828 in response to a query initiated or otherwise provided by a virtual application 828. The multi-tenant database 830 may alternatively be referred to herein as an on-demand database, in that the multi-tenant database 830 provides (or is available to provide) data at run-time to on-demand virtual applications 828 generated by the application platform 810.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants. Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

The server 802 is implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 807 and the like. The input/output features 807 generally represent the interface(s) to networks (e.g., to the network 845, or any other local area, wide area or other network), mass storage, display devices, data entry devices and/or the like. The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short or long term storage or other computer-readable media capable of storing programming instructions for execution on the processor 805, including any sort of random access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or application platform, e.g., a portable hard drive, a USB flash drive, an optical disc, or the like.

The application platform 810 is any sort of software application or other data processing engine that generates the virtual applications 828 that provide data and/or services to the client devices 840. In a typical embodiment, the application platform 810 gains access to processing resources, communications interfaces and other features of the processing hardware 804 using any sort of conventional or proprietary operating system 808. The virtual applications 828 are typically generated at run-time in response to input received from the client devices 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the client devices 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its client device 840, as appropriate.

The runtime application generator 820 suitably interacts with the query generator 814 to efficiently obtain multi-tenant data 832 from the database 830 as needed in response to input queries initiated or otherwise provided by users of the client devices 840. In a typical embodiment, the query generator 814 considers the identity of the user requesting a particular function (along with the user's associated tenant), and then builds and executes queries to the database 830 using system-wide metadata 836, tenant specific metadata 838, pivot tables 834, and/or any other available resources.

The query generator 814 in this example therefore maintains security of the common database 830 by ensuring that queries are consistent with access privileges granted to the user and/or tenant that initiated the request. In this manner, the query generator 814 suitably obtains requested subsets of data 832 accessible to a user and/or tenant from the database 830 as needed to populate the tables, reports or other features of the particular virtual application 828 for that user and/or tenant.

Still referring to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 826 such as "account" objects, "opportunity" objects, "contact" objects, or the like. The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled client device 840 on the network 845. In an exemplary embodiment, the client device 840 includes a display device, such as a monitor, screen, or another conventional electronic display capable of graphically presenting data and/or information retrieved from the multi-tenant database 830. Typically, the user operates a conventional browser application or other client program 842 executed by the client device 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. As noted above, the virtual application 828 may contain Java, ActiveX, or other content that can be presented using conventional client software running on the client device 840; other embodiments may simply provide dynamic web or other content that can be presented and viewed by the user, as desired.

A data item, such as a knowledge article, stored by one tenant (e.g., one department in a company) may be relevant to another tenant (e.g., a different department in the same company. One way of providing a user in another tenant domain with access to the article is to store a second instance of the article in the tenant domain of the second tenant. The apparatus, systems, techniques and articles described herein provide another way of providing a user in another tenant domain with access to the article without wasting resources by storing a second copy.

What is claimed:

1. A method for assigning computational problems to compute nodes over a network that provide machine learning problem-solving capability, comprising:
  receiving, from the compute nodes, information that relates to node-related processing attributes, the compute nodes being heterogeneous compute nodes with respect to the machine learning problem-solving capability and problem-solving speed, the node-related processing attributes comprising an indication of the type of problems the compute node can solve, an indication of the speed with which the compute node can solve a problem, and network latency attributes associated with the compute node;
  receiving, by a protocol manager, a computational problem to be solved;
  determining which one or more of the compute nodes are capable of solving the computational problem and the amount of time each compute node takes to solve the computational problem based upon the node-related processing attributes of the compute nodes;
  processing the network latency attributes by determining network latency metrics associated with the compute nodes by calculating a network distance vector from network locations of the compute nodes and a requestor point associated with a computer that provided the computational problem; and
  deciding which one or more of the compute nodes is to handle the computational problem based upon the determination of the one or more of the compute nodes being capable of solving the computational problem and the amount of time each compute node takes to solve the computational problem and upon the determination of the network latency metrics.

2. The method of claim 1, wherein the compute nodes contain machine learning-based processing components for providing different artificial intelligence problem-solving capabilities.

3. The method of claim 1, wherein a machine learning management protocol standardizes exchange of information among the compute nodes by distribution points accessing respective problem routing tables for exchanging and analyzing the machine learning problem-solving capability of the compute nodes.

4. The method of claim 3 further comprising:
  providing a service for self-discovery of technical capabilities associated with the compute nodes that are arranged in a machine learning cluster.

5. The method of claim 3, wherein the node-related processing attributes include data about which machine learning algorithms the compute nodes handle, wherein the node-related processing attributes include processing speed information based upon processing component types associated with the compute nodes.

6. The method of claim 5, wherein the compute nodes contain two or more different types of the following processing component types: central processing unit, application specific integrated circuit, field programmable gate array, and graphical processor unit; wherein the two or more different types of processing component types constitute a heterogeneous processing environment for the compute nodes.

7. The method of claim 5 further comprising:
determining processing component types of the compute nodes for analyzing the processing speed information;
wherein the deciding of which of the one or more compute nodes is to handle the computational problem is based upon the determined processing component types.

8. The method of claim 7 further comprising:
examining the computational problem request with respect to the determined processing component types of the compute nodes and machine learning compute resources associated with the compute nodes for solving the computational problem;
examining health and node failure information related to the compute nodes, wherein the examined health information is determined based upon whether the compute nodes pass algorithm health checks for each machine learning compute resource of a compute node; and
examining loads of the compute nodes;
wherein the deciding which of the one or more compute nodes is to handle the computational problem is based upon the determined processing component types, the examined computational problem request, the examined health and node failure information, the examined loads, and the determined network latency metrics.

9. The method of claim 1 further comprising:
accessing problem routing tables by a primary distribution point and a secondary distribution point to communicate information among the compute nodes regarding the machine learning problem-solving capabilities of the nodes.

10. The method of claim 9 further comprising:
accessing the problem routing tables by the primary and second distribution points for scaling to types of hardware that have faster problem-solving speeds than problem-solving speed of an application specific integrated circuit that solves the computational problem.

11. A system for assigning computational problems to compute nodes over a network that provide machine learning problem-solving capability, the system comprising:
one or more data processors; and
a memory storage device comprising executable instructions configurable to cause the one or more data processors to perform operations comprising:
receiving, from the compute nodes, information that relates to node-related processing attributes, the compute nodes being heterogeneous compute nodes with respect to the machine learning problem-solving capability and problem-solving speed, the node-related processing attributes comprising an indication of the type of problems the compute node can solve, an indication of the speed with which the compute node can solve a problem, and network latency attributes associated with the compute node;
receiving, by a protocol manager, a computational problem to be solved;
determining which one or more of the compute nodes are capable of solving the computational problem and the amount of time each compute node takes to solve the computational problem based upon the node-related processing attributes of the compute nodes;
processing the network latency attributes by determining network latency metrics associated with the compute nodes by calculating a network distance vector from network locations of the compute nodes and a requestor point associated with a computer that provided the computational problem; and
deciding which one or more of the compute nodes is to handle the computational problem based upon the determination of the one or more of the compute nodes being capable of solving the computational problem and the amount of time each compute node takes to solve the computational problem and upon the determination of the network latency metrics.

12. The system of claim 11, wherein the compute nodes contain machine learning-based processing components for providing different machine learning problem-solving capabilities.

13. The system of claim 11, wherein a machine learning management protocol standardizes exchange of information among the compute nodes by distribution points accessing respective problem routing tables for exchanging and analyzing the machine learning problem-solving capability of the compute nodes.

14. The system of claim 13, wherein a service is provided for self-discovery of technical capabilities associated with the compute nodes that are arranged in a machine learning cluster.

15. The system of claim 13, wherein the node-related processing attributes include data about which machine learning algorithms the compute nodes handle, wherein the node-related processing attributes include processing speed information based upon processing component types associated with the compute nodes.

16. The system of claim 15, wherein the compute nodes contain two or more different types of the following processing component types: central processing unit, application specific integrated circuit, field programmable gate array, and graphical processor unit; wherein the two or more different types of processing component types constitute a heterogeneous processing environment for the compute nodes.

17. The system of claim 15 wherein the operations performed by the one or more data processors include:
determining processing component types of the compute nodes for analyzing the processing speed information;
wherein the deciding of which of the one or more compute nodes is to handle the computational problem is based upon the determined processing component types.

18. The system of claim 17 wherein the operations performed by the one or more data processors include:
examining the computational problem request with respect to the determined processing component types of the compute nodes and machine learning compute resources associated with the compute nodes for solving the computational problem;
examining health and node failure information related to the compute nodes, wherein the examined health information is determined based upon whether the compute nodes pass algorithm health checks for each machine learning compute resource of a compute node; and examining loads of the compute nodes;

wherein the deciding which of the one or more compute nodes is to handle the computational problem is based upon the determined processing component types, the examined computational problem request, the examined health and node failure information, the examined loads, and the determined network latency metrics.

19. The system of claim 11 wherein problem routing tables are accessed by a primary distribution point and a secondary distribution point to communicate information among the compute nodes regarding the machine learning problem-solving capabilities of the compute nodes.

20. The system of claim 19 wherein the problem routing tables are accessed by the primary and second distribution points for scaling to types of hardware that have faster problem-solving speeds than problem-solving speed of an application specific integrated circuit that solves the computational problem.

21. A non-transitory, computer-readable medium containing computer-executable instructions thereon, which, when executed by a processor, are capable of performing a method comprising:

receive over a network, from compute nodes, information that relates to node-related processing attributes, the compute nodes being heterogeneous compute nodes with respect to machine learning problem-solving capability and problem-solving speed, the node-related processing attributes comprising an indication of the type of problems the compute node can solve, an indication of the speed with which the compute node can solve a problem, and network latency attributes associated with the compute node;

receive, by a protocol manager, a computational problem to be solved;

determining which one or more of the compute nodes are capable of solving the computational problem and the amount of time each compute node takes to solve the computational problem based upon the node-related processing attributes of the compute nodes;

processing the network latency attributes by determining network latency metrics associated with the compute nodes by calculating a network distance vector from network locations of the compute nodes and a requestor point associated with a computer that provided the computational problem; and decide which one or more of the compute nodes is to handle the computational problem based upon the determination of the one or more of the compute nodes being capable of solving the computational problem and the amount of time each compute node takes to solve the computational problem and upon the determination of the network latency metrics.

* * * * *